Patented Oct. 27, 1953

2,657,119

UNITED STATES PATENT OFFICE 2,657,119

CONVERSION OF SULFUR DIOXIDE TO SULFUR WITH HYDROQUINONES

Richard A. Patton, Pittsburgh, Pa., assignor to Texas Gulf Sulphur Company, New York, N. Y., a corporation of Texas No Drawing. Application July 6, 1950, Serial No. 172,380

10 Claims. (Cl. 23—226)

This invention relates to the conversion of sulphur dioxide to sulphur, and more particularly to the reduction of sulphur dioxide to sulphur by means of hydroquinones.

Sulphur dioxide is produced as a by-product in many industrial processes, for example in the roasting of sulphur-containing ores. Its presence in the off-gases of such processes is undesirable because of its corrosive effects and because, when present in large quantities, it contaminates the atmosphere. Similarly, sulphur dioxide is frequently present as an impurity in process gases, and must be removed therefrom before utilization of such gases. Methods for the removal of sulphur dioxide and its conversion into more desirable products include those in which the gas is reduced to sulphur, and my invention comprises a new and improved process for achieving this result.

Processes now used for the reduction of sulphur dioxide to sulphur employ coke or metal reducing agents, or gaseous reducing agents such as producer or hydrocarbon gases, carbon monoxide, ammonia or the like.

I have found that, although sulphur dioxide is itself ordinarily referred to as a reducing agent, it can itself, under appropriate conditions hereinafter set forth, be reduced to sulphur by certain hydroquinones. In the process, the hydroquinones are oxidized to corresponding quinones, which may then by reduction be regenerated back to the hydroquinone for reuse in the process. In this way I achieve the conversion of sulphur dioxide to sulphur with no substantial net consumption of the reducing agent. Other advantages and novel features of my process will be made clear by the description which follows.

For use in my invention I may select any hydroquinone with an oxidation potential numerically less than the reduction potential of sulphur dioxide with proper regard for the sign (or direction) of the process. In other words, since the reduction of sulphur dioxide to sulphur is expressed by the reaction:

$$SO_2 + 4H^+ + 4e \rightarrow S + H_2O + 0.47 \text{ volt}$$

and the oxidation of a hydroquinone ($H_2Q$) to its corresponding quinone ($Q$) by the formula:

$$2H_2Q \rightarrow 2Q + 4H^+ + 4e - m \text{ volts}$$

the combined reaction is shown by the algebraic addition of the two formulae:

$$SO_2 + 2H_2Q \rightarrow S + 2H_2O + 2Q + (0.47 - m) \text{ volts}$$

and the reaction would go forward where $(0.47 - m)$ is positive. However, since the driving force of the reaction, as measured by the free energy change, is a function of the difference in potential between sulphur dioxide and the hydroquinone, it is desirable to utilize a hydroquinone with as low an oxidation potential as possible.

This condition, I have found, is satisfied by anthrahydroquinone, for which $m$ in the above equation is 0.15. Moreover, the change of free energy for the reaction (the thermodynamic symbol for which is $\Delta F°_{298}$) when using anthrahydroquinone is $-29,600$ calories per mole, and therefore the reaction will proceed as written. I have found anthrahydroquinone to be very effective in my process. In general, I prefer to use hydroquinones for which the numerical value of $m$ in the above equation is above $-0.37$, though the reaction is thermodynamically possible with $m$ even smaller.

Other hydroquinones which I may use include 1,2-benzoanthrahydroquinone, and 1,4-napththohydroquinones substituted in the 2 position with ortho-para directing groups such as $-NHCH_3$, $-NH_2$, $-N(CH_3)_2$, $OH$, $OCH_3$, $CH_3$, $NHCOCH_3$, $C_6H_5$, or $OCOCH_3$.

Since the reaction is essentially an ionic one, I prefer to operate in an aqueous solution or suspension of the hydroquinone in dilute alcohol or acetone or other hydrophilic solvent. Since the amount of sulphur dioxide which can be treated in a given time is proportional to the concentration of the hydroquinone in solution, I prefer to use hydroquinones of relatively good solubility. The hydroquinones themselves or their sodium salts may be used. I have found that the solubility of the hydroquinones can be increased by the introduction into the hydroquinone nucleus, by sulfonation or otherwise, of hydrophilic groups. Although each sulfonate group introduced into the molecule lowers the oxidation potential, the effect is small, being only approximately 0.07 volt. Consequently, by the use of sulfonated hydroquinones I am able to achieve the advantage of increased solubility without any substantial loss of reaction driving force.

My process can be operated in a variety of forms of apparatus, as will be readily apparent to those skilled in the art, none of which is a feature of my present invention. In general, any known apparatus for effectively contacting a liquid with a gas may be used. For example, the solution of the hydroquinone may be passed downwardly through a packed column countercurrent to an ascending stream of sulphur dioxide or sulphur dioxide-containing gases. The sulphur produced in the reaction may be recovered in a cyclone separator or by electrical precipitation or by filtration. Since my process may be operated at substantially room or atmospheric temperatures of between 15 and 50° C. no complicated heating or heat exchange devices are necessary, although, since heat is evolved in the reaction, a cooler may be provided for the solution, part of which may be recirculated to the reaction vessel by procedures well known in the art.

*Examples*

1. 1 gm. of anthraquinone was shaken in 300 cc. of a 6N sodium hydroxide solution which was then heated to boiling. Stannous chloride was then added in small amounts until the red color of the sodium salt of anthrahydroquinone did not intensify further. The solution was cooled to room temperature and sulphur dioxide passed through it with good agitation. The red color was discharged. The reaction mixture contained anthraquinone and sulphur in suspension.

2. Sulphur dioxide was passed, with good agitation, through an aqueous acetone suspension-solution of 5.77 mol equivalents of anthrahydroquinone. The originally yellow-green suspension-solution became orange in color, some heat being evolved. Free sulphur in an amount equal to 18% of the theoretical (based on the hydroquinone present) was recovered from the suspension - solution, which also contained anthraquinone.

One of the economic advantages of my process is that the corresponding quinone, which is produced in the reaction, may be readily reduced or regenerated to the hydroquinone, which may then be reused in the reaction. For example, the reduction may be carried out using sodium hydrosulfite or other chemical reducing agent. Sodium hydrosulfite, as is well known, may be made by reduction of some of the sulphur dioxide. However, I prefer to use an electrolytic reduction process. Such a reduction can be carried out either by subjecting the quinone, after separation of the sulphur produced by my process, to electrolysis in a separate cell, or by employing an electrolytic reactor in which the proportions of quinone and hydroquinone are maintained constant by balancing the sulphur dioxide flow and the electrolytic regeneration of the hydroquinone. It will be noted that, whatever electrolytic reduction procedure be used, my invention accomplishes in effect the reduction of sulphur dioxide to sulphur by the application of electrical energy.

Moreover, where hydrogen sulfide or hydrogen sulfide-containing gases are available, I can utilize my present invention in connection with my invention for converting hydrogen sulfide to sulphur by means of quinones, for which I filed an application for Letters Patent December 10, 1949, Serial No. 132,381, now abandoned, and thereby use the hydrogen sulfide conversion as a means for regenerating the quinone to the hydroquinone. As pointed out with greater particularity in the application for the oxidation of hydrogen sulfide, the oxidation potential of the reaction hydrogen sulfide to sulphur is −0.170 volt. Consequently, to carry out the two processes simultaneously and to use the hydrogen sulfide reaction as a means of regenerating the quinone produced in the sulphur dioxide reaction, it is necessary to use quinones with a potential between −0.17 and +0.47 volt, so that the requirements of both reactions would be satisfied. Such quinones include the substituted 1,4-naphthoquinones having ortho-para directing groups in the 2 position described above. By using such quinones, I am able to reduce the quinone to the corresponding hydroquinone while carrying out the oxidation of hydrogen sulfide to sulphur and, in an adjacent reaction vessel, to convert sulphur dioxide to sulphur while transforming the hydroquinone to the quinone.

I have described my new process in terms of the preferred operation in which an aqueous solution of the hydroquinone is used. However, I may also carry out my process using suspensions of a suitable hydroquinone in water or other liquids, or I may use the hydroquinone in solid form, either supported on or admixed with asbestos or other carrier or by using the so-called fluidized solid technic now well known in the art of chemical engineering, in which I established a fluid-like bed of a finely powdered hydroquinone suspended in the sulphur dioxide-containing gas. When using solid hydroquinones it is necessary to supply some moisture to the system, which may be done by introducing steam or small amounts of water either with the hydroquinone or with the sulphur dioxide.

In the above description and the following claims I have used the term "hydroquinone" generically to designate the substances already described as being suitable for my process. These include all hydroquinones, and substituted hydroquinones having an oxidation potential of more than −0.47 volt, including the corresponding sodium salts, sulfonates and other more soluble derivatives. The electrochemical terms used herein are used in the sense in which they are defined in Glasston's "Introduction to Electrochemistry," published 1942 by D. Van Nostrand & Co.

I claim:

1. The process of producing sulphur by the reduction of sulphur dioxide comprising reacting a sulphur dioxide-containing gas with a hydroquinone having an oxidation potential of more than −0.47 volt.

2. The process of producing sulphur from sulphur dioxide comprising reacting a sulphur dioxide-containing gas with an aqueous solution comprising a hydroquinone having an oxidation potential of more than −0.47 volt.

3. The process for converting sulphur dioxide to sulphur comprising reacting sulphur dioxide with a hydroquinone having an oxidation potential of more than −0.47 volt, thereby converting at least part of said sulphur dioxide into sulphur and at least part of said hydroquinone into the corresponding quinone, continuously reducing said quinone so produced, thereby regenerating it into the hydroquinone, and reacting additional quantities of sulphur dioxide with the regenerated hydroquinone.

4. The process of producing sulphur comprising passing sulphur dioxide into contact with a hydroquinone having an oxidation potential of more than −0.47 volt, thereby converting at least part of said sulphur dioxide to sulphur and at least part of said hydroquinone to the corresponding quinone, separating sulphur from the reaction products, contacting hydrogen sulfide with the quinone so formed, thereby producing additional sulphur and regenerating said quinone to said hydroquinone, separating said additional sulphur from the reaction products, and contacting regenerated hydroquinone with additional quantities of sulphur dioxide.

5. The process of producing sulphur comprising reacting a sulphur dioxide-containing gas with a hydroquinone having an oxidation potential between −0.17 and +0.47 volt, separating sulphur formed in the reaction from the reaction products, continuously reducing the quinone formed in the reaction to thereby regenerate the hydroquinone, and reacting additional quantities of a sulphur dioxide-containing gas with said regenerated hydroquinone.

6. A continuous process for converting sulphur dioxide to sulphur comprising the steps of reducing said sulphur dioxide by reacting it with a hydroquinone having an oxidation potential above −0.47 volt, continuously regenerating the hydroquinone by electrolytically reducing the corresponding quinone formed in the reaction, and reacting additional quantities of sulphur dioxide with said regenerated hydroquinone.

7. A process for the conversion of sulphur dioxide to sulphur comprising continuously passing sulphur dioxide into intimate contact with a reaction mixture comprising a hydroquinone having an oxidation potential of more than −0.47 volt and water, thereby oxidizing at least part of the hydroquinone to the corresponding quinone, and maintaining the activity of the reaction mixture by concurrently reducing said quinone back to the hydroquinone at substantially the same rate at which it is being oxidized by the sulphur dioxide.

8. A continuous process for the conversion of sulphur dioxide to sulphur comprising establishing and maintaining a cycle in which a hydroquinone having an oxidation potential of more than −0.47 volt is oxidized to the corresponding quinone in one stage of the cycle and the quinone is reduced back to the hydroquinone in another stage of the cycle, effecting the oxidation in the first-named stage by reacting the hydroquinone with the sulphur dioxide in the presence of water, and removing sulphur formed by the reaction from the material in the cycle.

9. The cyclic process for removing sulphur dioxide from gases containing the same and reducing it to sulphur comprising creating a circuitous flow of a solution of a hydroquinone having an oxidation potential of more than −0.47 volt, reacting said sulphur dioxide with said hydroquinone to reduce said sulphur dioxide to sulphur and to oxidize said hydroquinone to a quinone by contacting said gas containing said sulphur dioxide with said flow of solution of hydroquinone, separating sulphur from said flow, passing said flow to a reducing station and there reducing said quinone in said flow to hydroquinone by electrolytic reduction and passing said flow with said regenerated hydroquinone to contact said gas to re-initiate the cycle.

10. The cyclic process for removing sulphur dioxide from gases containing the same and reducing it to sulphur comprising creating a circuitous flow of a solution of a hydroquinone having an oxidation potential of more than −0.47 volt, reacting said sulphur dioxide with said hydroquinone to reduce said sulphur dioxide to sulphur and to oxidize said hydroquinone to a quinone by contacting said gas containing said sulphur dioxide with said flow of solution of hydroquinone, separating sulphur from said flow, passing said flow to a reducing station and there reducing said quinone in said flow to hydroquinone and passing said flow with said regenerated hydroquinone to contact said gas to re-initiate the cycle.

RICHARD A. PATTON.

References Cited in the file of this patent

UNITED STATES PATENTS

| Number | Name | Date |
| --- | --- | --- |
| 1,724,928 | Hailwood | Aug. 20, 1929 |
| 1,955,722 | Ahlquist | Apr. 24, 1934 |
| 2,015,038 | Pevere | Sept. 17, 1935 |
| 2,135,368 | Vagenius et al. | Nov. 1, 1938 |

OTHER REFERENCES

Karrer, Organic Chemistry (1946), p. 421.

Conant, Chemistry of Organic Compounds (1939), pp. 387–88.

Degering, Outline of Organic Chemistry, 4th Ed. (1941), p. 202.

Ebberts et al., American Electrochemical Society, vol. 45 (1924), pp. 49–55.

Glasstone et al., Electrolytic Oxidation and Reduction (1936), pp. 90–92.